United States Patent
Kondo

(10) Patent No.: US 10,944,913 B2
(45) Date of Patent: Mar. 9, 2021

(54) IMAGING ELEMENT, IMAGING DEVICE, AND CONTROL METHOD

(71) Applicant: CANON KABUSHIKI KAISHA, Tokyo (JP)

(72) Inventor: Hiroshi Kondo, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/451,140

(22) Filed: Jun. 25, 2019

(65) Prior Publication Data
US 2020/0045217 A1 Feb. 6, 2020

(30) Foreign Application Priority Data
Jul. 31, 2018 (JP) .............................. JP2018-143423

(51) Int. Cl.
*H04N 5/235* (2006.01)

(52) U.S. Cl.
CPC ................................ *H04N 5/2353* (2013.01)

(58) Field of Classification Search
CPC ... H04N 5/2353; H04N 5/2351; H04N 5/2352
See application file for complete search history.

(56) References Cited

U.S. PATENT DOCUMENTS

| 2009/0080794 | A1* | 3/2009 | Amano | ................... | G06T 5/009 |
| | | | | | 382/274 |
| 2013/0188074 | A1* | 7/2013 | Nakabayashi | ......... | H04N 5/238 |
| | | | | | 348/223.1 |
| 2014/0178061 | A1* | 6/2014 | Saita | ................... | G03B 7/0807 |
| | | | | | 396/241 |
| 2015/0009361 | A1* | 1/2015 | Liu | ....................... | H04N 5/2356 |
| | | | | | 348/229.1 |
| 2015/0015774 | A1* | 1/2015 | Sugie | .................. | H04N 5/2353 |
| | | | | | 348/364 |
| 2015/0156388 | A1* | 6/2015 | Neglur | ................. | H04N 5/2353 |
| | | | | | 348/366 |
| 2015/0373246 | A1* | 12/2015 | Arakawa | .............. | H04N 5/2356 |
| | | | | | 348/234 |
| 2016/0373635 | A1* | 12/2016 | Ikeda | ................... | H04N 5/2355 |
| 2018/0367735 | A1* | 12/2018 | Kosaka | ............... | H04N 5/23245 |
| 2019/0320107 | A1* | 10/2019 | Zhou | .................... | H04N 5/2351 |

FOREIGN PATENT DOCUMENTS

JP         2009296353 A    12/2009

* cited by examiner

*Primary Examiner* — Timothy J Henn

(74) *Attorney, Agent, or Firm* — Carter, DeLuca & Farrell LLP

(57) ABSTRACT

An imaging element which outputs an image signal acquired by an imaging unit having a plurality of pixel portions is provided. The imaging element receives a target luminance value from an imaging device and executes exposure control in the imaging element on the basis of an accumulation time of the pixel portion and a gain for an output signal of the imaging unit, which correspond to the target luminance value. The imaging element instructs the imaging device to perform exposure control if a luminance value of a subject exceeds an exposure control range in the imaging element.

10 Claims, 6 Drawing Sheets

IMAGING ELEMENT, IMAGING DEVICE, AND CONTROL METHOD

BACKGROUND OF THE INVENTION

Field of the Invention

The present invention relates to an imaging element, an imaging device, and a control method.

Description of the Related Art

An imaging device such as a digital camera having a live view function has been proposed. The imaging device generally performs display and recording of captured images with appropriate brightness by performing automatic exposure (AE) control in real time. An exposure control factor has a shutter speed, an aperture, and an ISO sensitivity. In addition, an imaging device which incorporates a ND filter in the imaging device and is automatically switched has also been proposed. ND is an abbreviation for neutral density. Some of these exposure control factors are fixedly used according to a user's photography intentions, but the imaging device can perform AE tracking in a wider luminance range by making the exposure control factor variable.

In addition, there are more imaging devices equipped with a high frame rate video such as 120 fps to 1000 fps and a resolution has become higher. Due to high functionality of imaging devices, a load ratio and a memory bandwidth of a calculation processing unit (hereinafter, referred to as a "CPU") in an imaging device have increased, and the time required for exposure calculation processing in the CPU has increased. CPU is an abbreviation for central processing unit. If it takes time for exposure calculation processing, tracking of exposure change is further delayed, and thus the number of frames of abnormal exposure which causes a flicker may increase.

Japanese Patent Laid-Open No. 2009-296353 discloses an imaging element that speeds up exposure control processing of a CPU by integrating pieces of image information for respective colors of color filters, transferring an integrated value to the CPU, and shortening the time taken for processing of transferring image data.

The imaging element disclosed in Japanese Patent Laid-Open No. 2009-296353 speeds up exposure control by integrating pieces of captured image information to output it to the outside, and reducing the amount of data transferred between a sensor and the CPU. However, in this imaging element, calculation for an electronic shutter and a gain according to a program diagram is required in the CPU after the integrated value is received, and a CPU processing load increases and exposure calculation processing is delayed when high-speed driving such as in a high frame rate video is required.

SUMMARY OF THE INVENTION

The present invention provides an imaging element capable of performing exposure control suitable for imaging purposes while reducing calculation processing regarding exposure control in an imaging device and securing a wide tracking range for the exposure control.

An imaging element according to an embodiment of the present invention is an imaging element which outputs an image signal acquired by an imaging unit having a plurality of pixel portions, and includes a receiver configured to receive a target luminance value from an imaging device, and a controller configured to execute exposure control in the imaging element on the basis of an accumulation time of the pixel portion and a gain for an output signal of the imaging unit, which correspond to the target luminance value. The controller instructs the imaging device to perform exposure control if a luminance value of a subject exceeds an exposure control range in the imaging element.

Further features of the present invention will become apparent from the following description of exemplary embodiments with reference to the attached drawings.

DESCRIPTION OF THE EMBODIMENTS

Example 1

Figure 1:
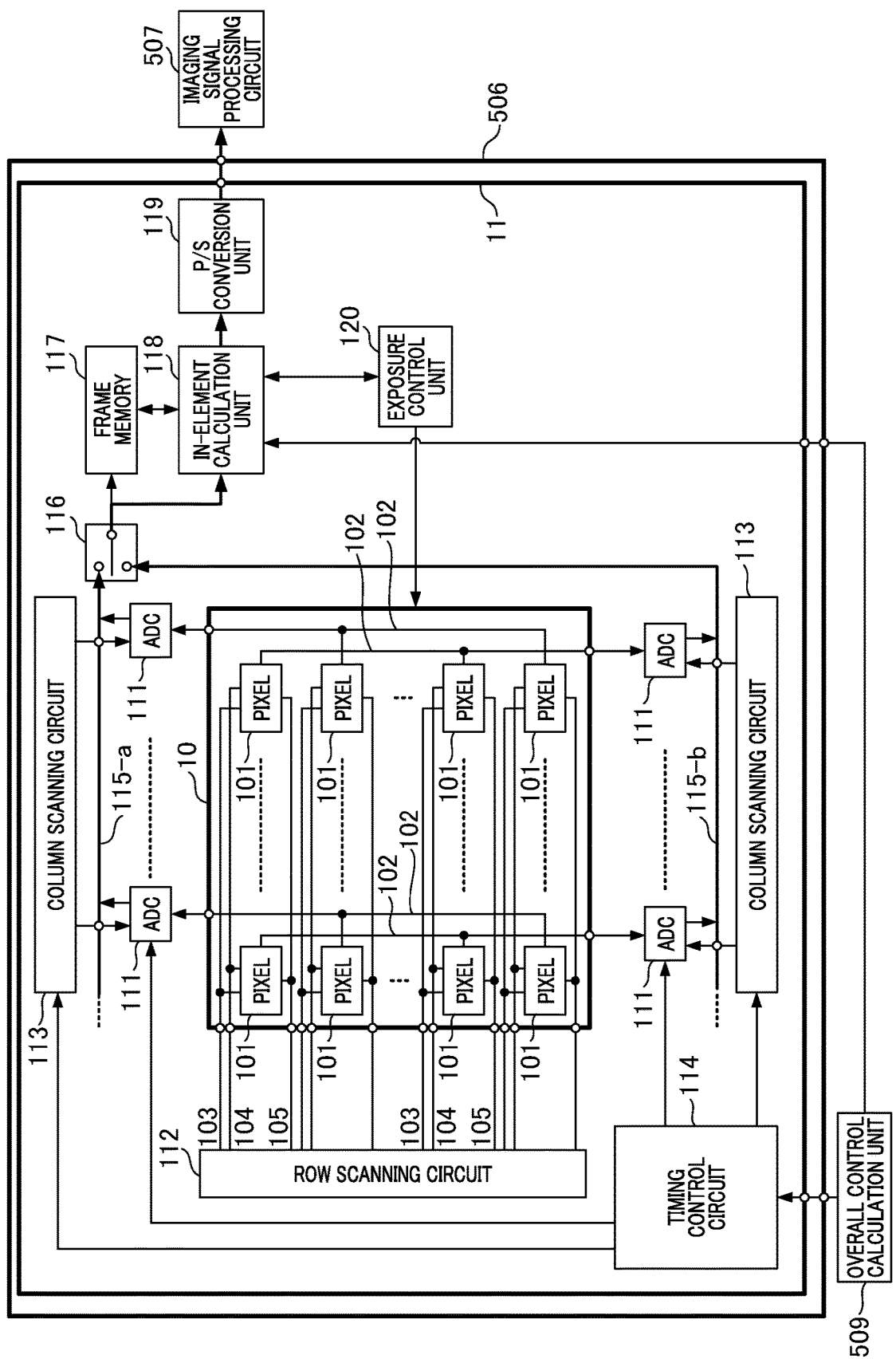
FIG. 1 is a diagram which shows a configuration example of an imaging element.

FIG. 1 is a diagram which shows a configuration example of an imaging element in the present embodiment.

A plurality of pixel portions 101 are arranged in a two-dimensional array in an imaging element 506. In the example shown in FIG. 1, the imaging element 506 has a stacked configuration, and includes a first chip (imaging layer) 10 which is an imaging unit, and a second chip (circuit layer) 11. The imaging element 506 outputs an image signal acquired by the first chip 10. An imaging signal processing circuit 507 processes an output signal of the imaging element 506. An overall control calculation unit 509 is a central part which controls the imaging element 506 and the other constituents in an imaging device. In the present embodiment, the imaging signal processing circuit 507 and the overall control calculation unit 509 are different in configuration, but the present invention is not limited thereto, and they may be configured on the same circuit including a CPU.

A vertical output line 102, a transfer signal line 103, a reset signal line 104, and a row selection signal line 105 are connected to each pixel portion 101. A column ADC block 111 outputs a signal obtained by an analog (A) to digital (D) conversion with respect to a signal output from the vertical output line 102 connected to the pixel portion 101. A row scanning circuit 112 is connected to the pixel portion 101 using the transfer signal line 103, the reset signal line 104, and the row selection signal line 105. A plurality of column scanning circuits 113 is connected to a plurality of column ADC blocks 111 using horizontal signal lines 115-$a$ and 115-$b$. A timing control circuit 114 performs control by outputting a timing control signal to a column ADC block 111 and a column scanning circuit 113. In the column ADC block 111, signal amplification may be performed using a conversion gain when it is used in digital conversion, or signal amplification may also be performed by a digital gain circuit (not shown) after the digital conversion.

A switching unit 116 switches respective signals according to the horizontal signal lines 115-$a$ and 115-$b$, and outputs the signals to a frame memory 117 and an in-element calculation unit 118. A parallel serial conversion unit (hereinafter, referred to as a "P/S conversion unit") 119 acquires an output of the in-element calculation unit 118 and performs a parallel-serial conversion. The P/S conversion unit 119 outputs a converted signal to the imaging signal processing circuit 507.

The imaging element 506 is a structure in which the first chip 10 is stacked on the second chip 11. The first chip 10 has a plurality of pixel portions 101 arranged in a matrix shape, and is disposed on a light incident side. That is, the first chip 10 is positioned on the incident side for receiving light from a subject. Each pixel portion 101 is connected to the transfer signal line 103, the reset signal line 104, and the row selection signal line 105 in a horizontal direction (a row direction), and is connected to the vertical output line 102 in a vertical direction (a column direction). Note that the vertical output lines 102 have different connection destinations depending on a reading line unit.

Pixel drive circuits such as the column ADC block 111, the row scanning circuit 112, the column scanning circuit 113, and the timing control circuit 114, the frame memory 117, the in-element calculation unit 118, the P/S conversion unit 119, and the exposure control unit 120 are formed in the second chip 11.

Such an imaging element 506 has the pixel portion 101 formed in the first chip 10 and a pixel drive circuit, a memory circuit, a calculation circuit, and the like formed in the second chip 11. Since a manufacturing process can be divided between an imaging layer and a circuit layer of the imaging element 506, it is possible to achieve wiring thinning in the circuit layer, speeding up due to an increased density, decrease in size, and high functionality. Note that a part of a circuit of the second chip 11 may also be provided on the first chip 10.

In the present embodiment, exposure control which has been conventionally performed by an imaging signal processing operation on a side of the imaging device is performed in the circuit layer. That is, the imaging element 506 has a configuration capable of performing exposure calculation based on a result of luminance detection and performing exposure time and gain control in only the imaging element. However, since a range in which exposure control can be performed using an exposure time and gain control is limited, if a luminance value of a subject exceeds an exposure control range in the imaging element, a change of exposure changing units (an aperture, a ND filter, an imaging frame rate, a digital gain) on the side of the imaging device can be made.

The switching unit 116 selectively outputs image signals output from the horizontal signal lines 115-a and 115-b for each channel sequentially to a frame memory 117. The frame memory 117 temporarily stores the output image signals. The in-element calculation unit 118 performs calculation of exposure control in the imaging element 506, or the like. The in-element calculation unit 118 receives a target luminance value from the overall control calculation unit 509, and calculates an accumulation time of the pixel portion 101 and a gain for an output signal of the first chip 10 on the basis of a signal output by the switching unit 116 and the target luminance value. The P/S conversion unit 119 performs conversion on image information processed by the in-element calculation unit 118 according to a timing control signal of the timing control circuit 114, and outputs the information to the imaging signal processing circuit 507 outside the imaging element 506. The exposure control unit 120 performs exposure control on the pixel portion 101 on the basis of the accumulation time and gain calculated by the in-element calculation unit 118.

Figure 2:
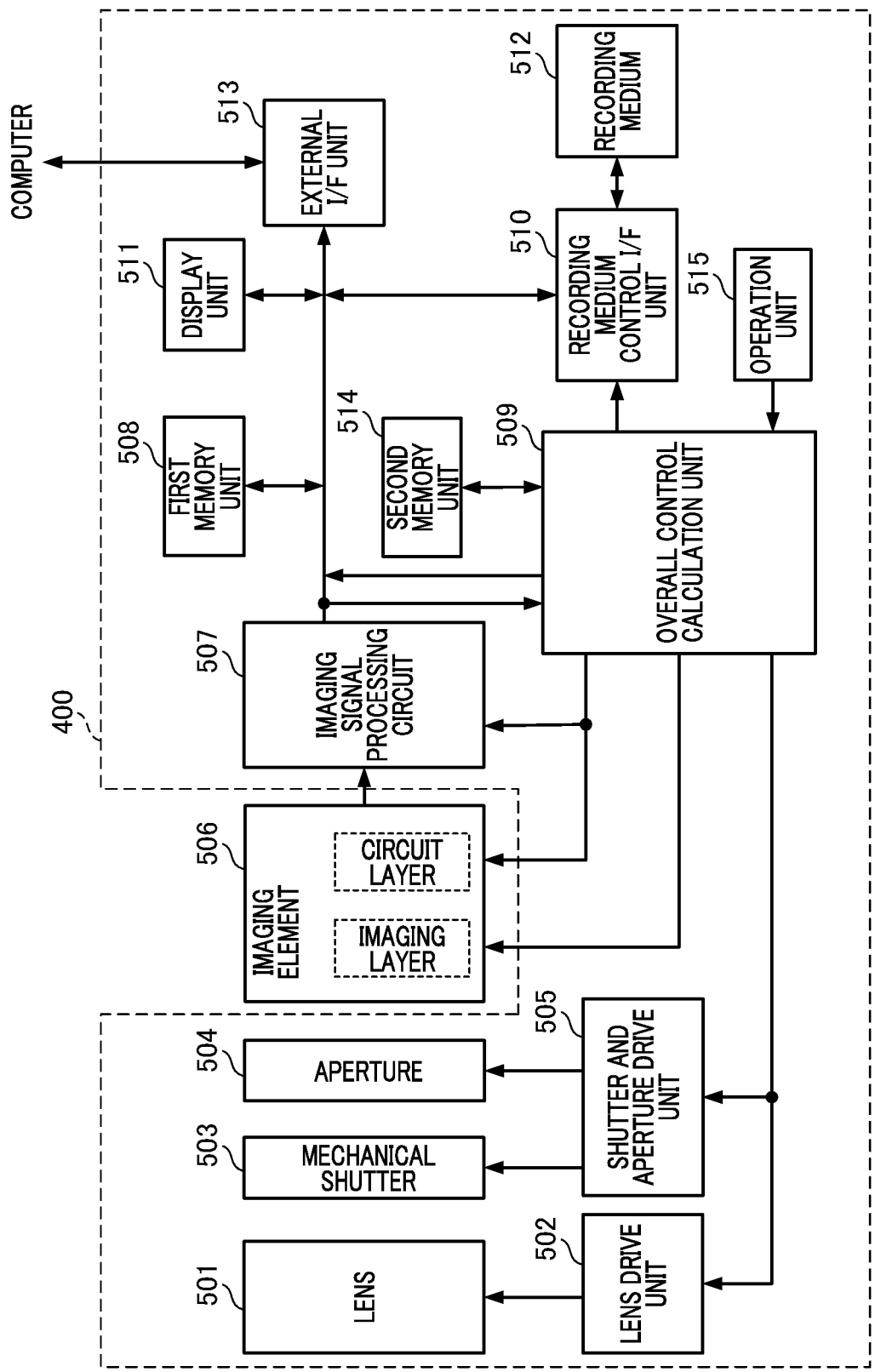
FIG. 2 is a diagram which shows a system configuration of the present embodiment.

FIG. 2 is a diagram which shows a system configuration of the present embodiment.

An imaging system is realized by an imaging device 400 and the imaging element 506. The imaging device 400 is connected to the imaging element 506 and realizes shooting, displaying, and recording. Of course, the imaging device 400 can realize an entire device having the imaging element 506 as an imaging device. A lens unit 501 is controlled by a lens drive unit 502. As a result, driving control of zooming, focusing, and the like is performed. A mechanical shutter 503 and an aperture 504 are driven and controlled by a shutter and aperture drive unit 505. Adjustment is performed using the aperture 504 such that a subject image passing through the lens unit 501 has an appropriate light intensity and is formed on an imaging surface on the imaging element 506. The subject image formed on the imaging surface on the imaging element 506 is photo-electrically converted by the pixel portion 101 (FIG. 1). A signal obtained by the photoelectric conversion is subjected to a gain adjustment and an A/D conversion in which a conversion from an analog signal to a digital signal is performed, and is output to the imaging signal processing circuit 507 as R, Gr, Gb, or B signals.

The imaging signal processing circuit 507 performs various types of imaging signal processing such as low-pass filter processing for reducing noise, shading processing, and WB processing, and further performs various corrections, compression of an image signal, and the like. The overall control calculation unit 509 performs control and various calculations on an entire imaging system. A first memory unit 508 temporarily stores an image signal. A recording medium control interface (I/F) unit 510 performs recording or reading of an image signal on a recording medium. A display unit 511 performs display of an image signal. A recording medium 512 is a detachable storage medium such as a semiconductor memory, and performs recording or reading of an image signal.

An external I/F unit 513 is an interface used to communicate with an external computer or the like. A second memory unit 514 performs storage of a result of calculation by the overall control calculation unit 509 and storage of camera information set in an imaging device by a user through an operation unit 515. Information regarding driving conditions of an imaging system, which is set by a user through the operation unit 515, is sent to the overall control calculation unit 509 and control of an entire imaging system is performed on the basis of the information.

Figure 3:
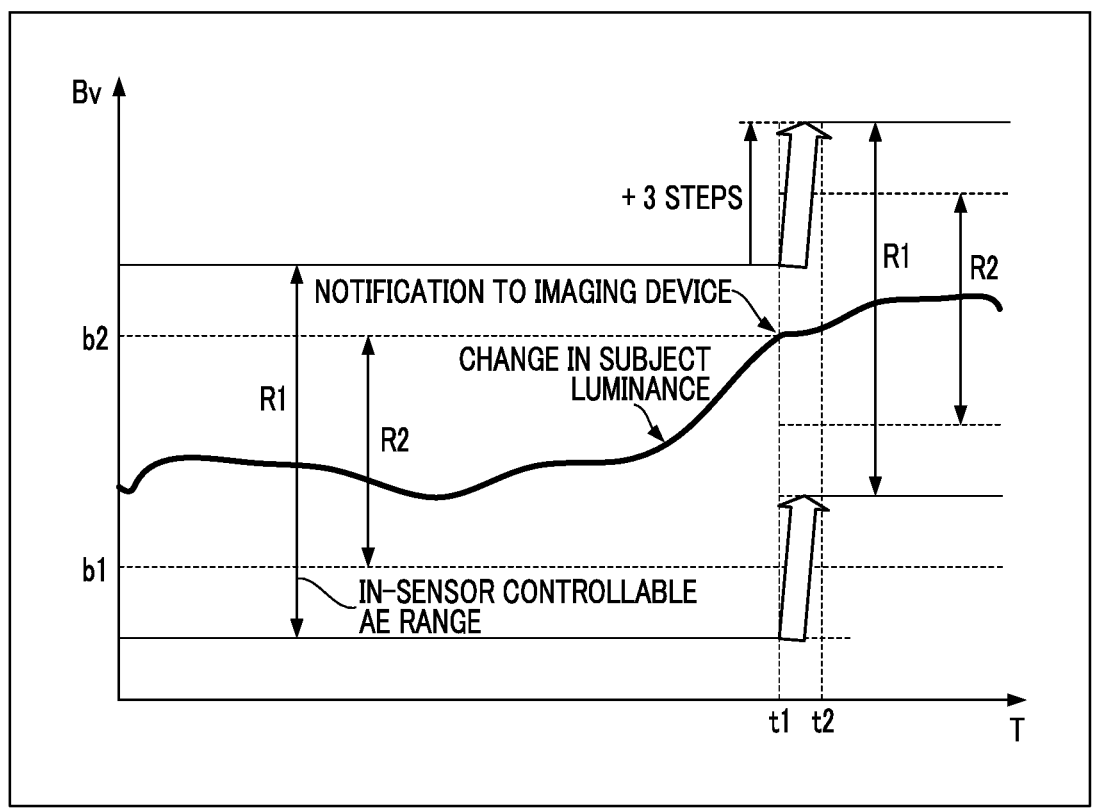
FIG. 3 is a view which shows exposure control.

FIG. 3 is a view which shows exposure control in the present embodiment.

Change in the luminance range in accordance with a change in luminance of a subject will be described with reference to FIG. 3. A horizontal axis of FIG. 3 indicates an elapsed time T from a start of control. A vertical axis thereof indicates a subject luminance By. In the following description, exposure control will also be described as AE control.

The imaging element 506 can perform AE control in the element (AE control in the imaging element). Factors which can be controlled by the imaging element 506 are an exposure time corresponding to the accumulation time of the pixel portion 101 (corresponding to a shutter speed), and a gain (corresponding to ISO sensitivity). The AE control in the imaging element is more restricted than in the exposure control range which can be controlled by an entire imaging system, including an aperture, a ND filter, and the like, and the range which control is possible is limited to R1 in FIG. 3.

The imaging device 400 sets an AE control range in the imaging element as R2 which is a range narrower than R1 in advance with respect to the imaging element 506. A lower limit By value is set to b1, and an upper limit By value is set to b2. The AE control range in the imaging element is an exposure control range in the imaging element. The imaging device 400 transmits information on the set AE control range in the imaging element to the imaging element 506. This is to prevent a delay from occurring in exposure control caused by an AE operation being stopped if the luminance of a subject exceeds a tracking range of the AE control in the imaging element.

In the luminance range of b1 to b2, the exposure control unit 120 included in the imaging element 506 executes the AE control in the imaging element and performs control of the exposure time and the gain according to the change in luminance. If the subject luminance is b2 at time t1, the exposure control unit 120 requests the imaging device 400 to change the luminance range by +3 steps. The request for changing the luminance range is an exposure control instruction. The in-element calculation unit 118 in the imaging element 506 may measure a latest rate of change of the subject luminance and determines the number of steps of the luminance range of a change according to a result of the measurement. As a result, it is possible to determine the number of steps of change in a luminance range after taking a future change in luminance forecast into consideration. Therefore, the AE control range in the imaging element can be used effectively, and a CPU calculation load of the imaging device can be reduced.

The exposure control unit 120 may perform control such that an upper limit (b2) of the exposure control range within the imaging element before the request for changing the luminance range is performed is positioned at a center of the exposure control range in the imaging element after the luminance range is changed by the request for changing the luminance range. As a result, it is possible to cope with a wide range of the future change in subject luminance.

The overall control calculation unit 509 included in the imaging device 400 executes exposure control (exposure change) in response to the request for changing the luminance range from the imaging element 506 using a predetermined exposure changing unit. The overall control calculation unit 509 executes exposure control by using a ND filter as an exposure changing unit, and inserting or retracting the ND filter. In the present embodiment, the ND filter incorporated in the imaging device has a specification that the luminance is reduced by 3 steps by the insertion. However, a certain amount of time is required for the insertion or retraction of the ND filter. In FIG. 3, it is shown that the insertion of the ND filter is completed at time t2, and the AE control range shifts to the high luminance side by +3 steps. The overall control calculation unit 509 transmits information (timing information) on a timing of exposure control in the imaging device 400 to the imaging element 506. Then, the exposure control unit 120 included in the imaging element 506 sets the timing of exposure control in the imaging element on the basis of the received timing information to reduce flickering of live images. As a result, the AE control in the imaging element is corrected.

Figure 4:
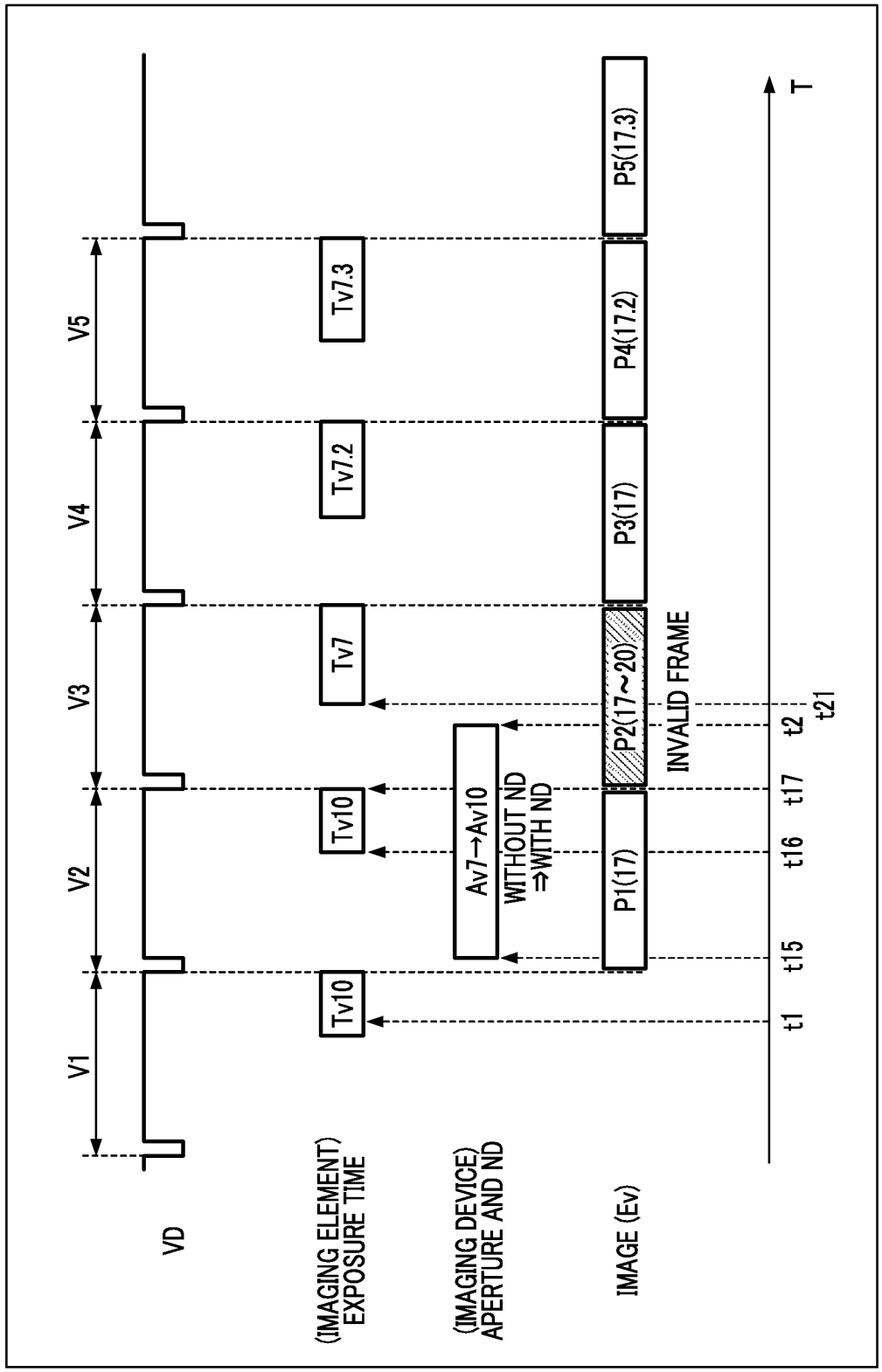
FIG. 4 is a diagram which shows an example of a timing chart when a ND filter is inserted.

FIG. 4 is a diagram which shows an example of a timing chart when a ND filter is inserted.

FIG. 4 shows a timing of a vertical synchronization signal (VD) given to the imaging element 506 and an exposure timing of the imaging element 506. At time t15, the imaging device 400 inserts the ND filter, and thereby an Av value according to an aperture and a ND filter changes from Av7 to Av10, for example.

In addition, FIG. 4 shows a timing at which a signal is read out from the imaging element 506 together with an Ev value. At T=t1, a request for changing the luminance range by +3 steps is made from the imaging element 506. The overall control calculation unit 509 performs control such that the ND filter is operated after a period until T=t15 during which exposure has not been performed to minimize an impact on an image. 1 VD or more time is required for the insertion of the ND filter, and the ND filter is in a transient state in a period from T=t16 to t17 in which there is exposure during this time, and an image P2 read out during a V3 period that is a next VD period contains a flicker, and is not a preferred image. Therefore, the overall control calculation unit 509 performs control such that the image P2 is set as an invalid frame, and an image P1 is output as an alternative image. If the insertion of the ND filter is completed at time T=t2, the imaging device starts the exposure of the imaging element 506 at time t21 and changes a Tv value from Tv10 to Tv7. As a result, control is performed such that the Ev value of an image P3 read out in a V4 period is 17, and has the same luminance value as the image P1. Thereafter, AE control in the imaging element is continued according to a change of the subject luminance.

Figure 5:
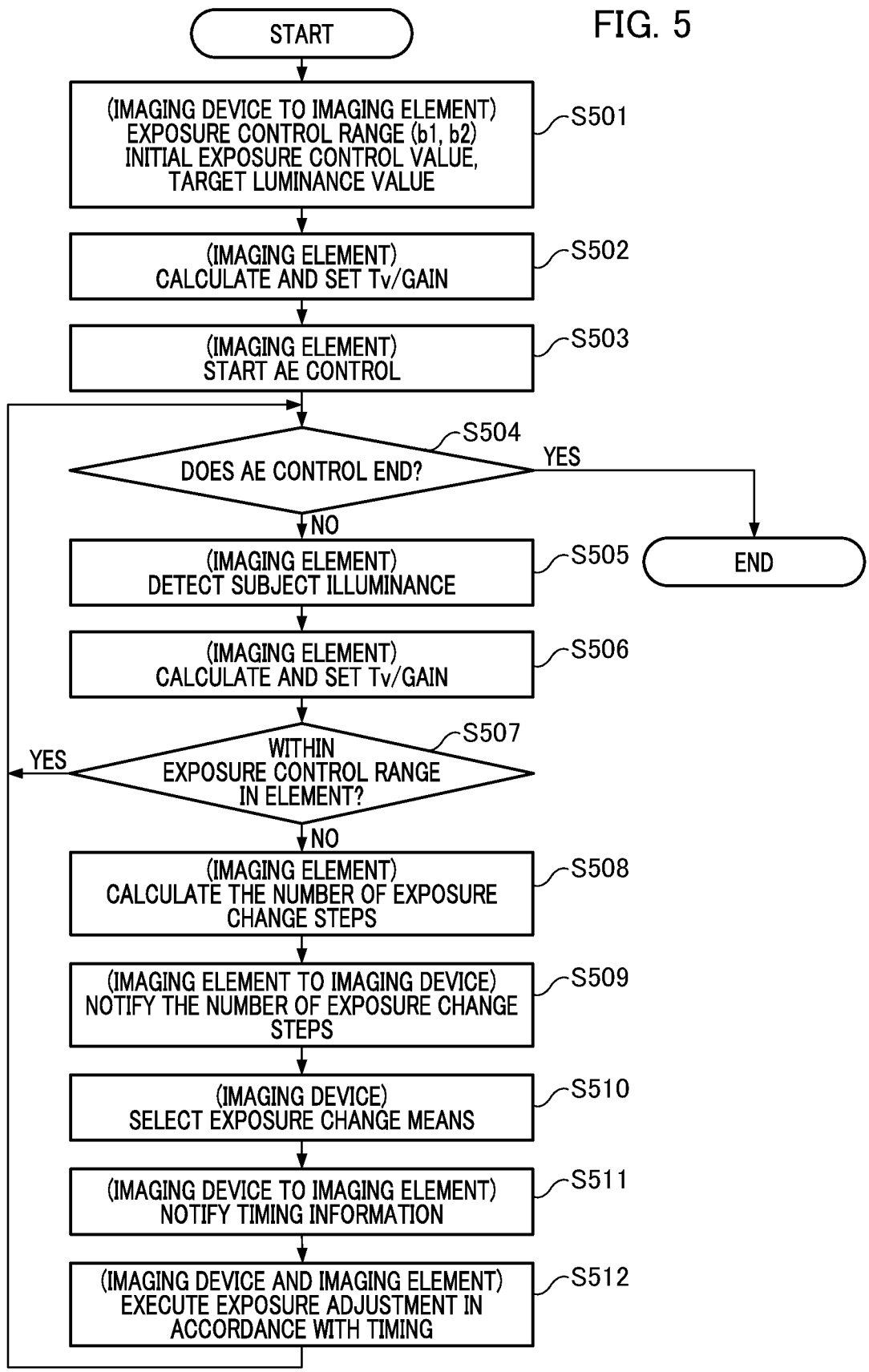
FIG. 5 is a flowchart which shows exposure control.

FIG. 5 is a flowchart which shows exposure control in the present embodiment.

If the exposure control is started, the imaging device 400 sets an exposure control range in the imaging element (the lower limit b1 and the upper limit b2) and notifies it to the imaging element 506 in S501. In addition, the imaging device 400 notifies information (an initial exposure control value) regarding a current aperture of the imaging device, a ND filter, a digital gain, and an imaging frame rate. Moreover, the imaging device 400 sets a target luminance value and notifies it to the imaging element 506.

Next, the imaging element 506 calculates and sets the exposure time and the gain on the basis of the target luminance value and the initial exposure control value in S502. Subsequently, the imaging element 506 starts AE control in S503. As a result, the AE control in the imaging element is started.

Next, the imaging element 506 determines whether to end the AE control in S504. For example, if an instruction to start still image shooting is given by an operation of a user via the operation unit 515, or if an instruction to turn off power is given, the imaging element 506 determines to end the AE control. If the imaging element 506 determines to end the AE control, the processing ends. If the imaging element 506 determines not to end the AE control, the processing proceeds to S505.

In S505, the imaging element 506 detects the luminance of a subject on the basis of a signal output from the pixel portion 101. Subsequently, in S506, the imaging element 506 calculates and sets the exposure time and the gain as in the processing in S502.

Next, in S507, the imaging element 506 determines whether the detected luminance of a subject is within the exposure control range in the imaging element. If the imaging element 506 determines that the luminance of a subject is within the exposure control range in the imaging element, the processing returns to S504. If the imaging element 506 determines that the luminance of a subject exceeds the exposure control range in the imaging element, the processing proceeds to S508.

In S508, the exposure control unit 120 included in the imaging element 506 determines the details of exposure control that instructs the imaging device 400. In this example, the exposure control unit 120 determines the number of steps (the number of exposure change steps) of the luminance range of a change. Then, the exposure control unit 120 notifies the determined number of exposure change steps to the imaging device 400 in S509. As a result, an exposure control instruction is given to the imaging device 400.

Next, the overall control calculation unit 509 included in the imaging device 400 selects and sets an exposure changing unit in accordance with the number of exposure change steps notified from the imaging element 506 in S510. In addition, the overall control calculation unit 509 notifies the imaging element 506 of time required for exposure control and timing information on a chronological change of the luminance value in S511. Then, both the imaging element 506 and the imaging device 400 execute exposure adjustment in accordance with the timing information in S512. Then, the processing returns to S504.

Through the above processing, the overall control calculation unit 509 can perform exposure control for respective frames not only with an increased CPU load and memory bandwidth but also even if an exposure calculation processing time is too long in a driving mode in which processing is severe in terms of time, such as with high frame rate video. According to the present example, if the luminance value of a subject exceeds a tracking range of the AE control while the AE control is performed basically only in the imaging element 506, the imaging device 400 can continue an exposure control operation with minimum delay using the exposure changing unit.

Example 2

In Example 1, although the change in the luminance range when the luminance of a subject has transitioned to a high luminance side has been described, processing if the luminance of a subject has transitioned to a low luminance side will be described in Example 2.

Figure 6:
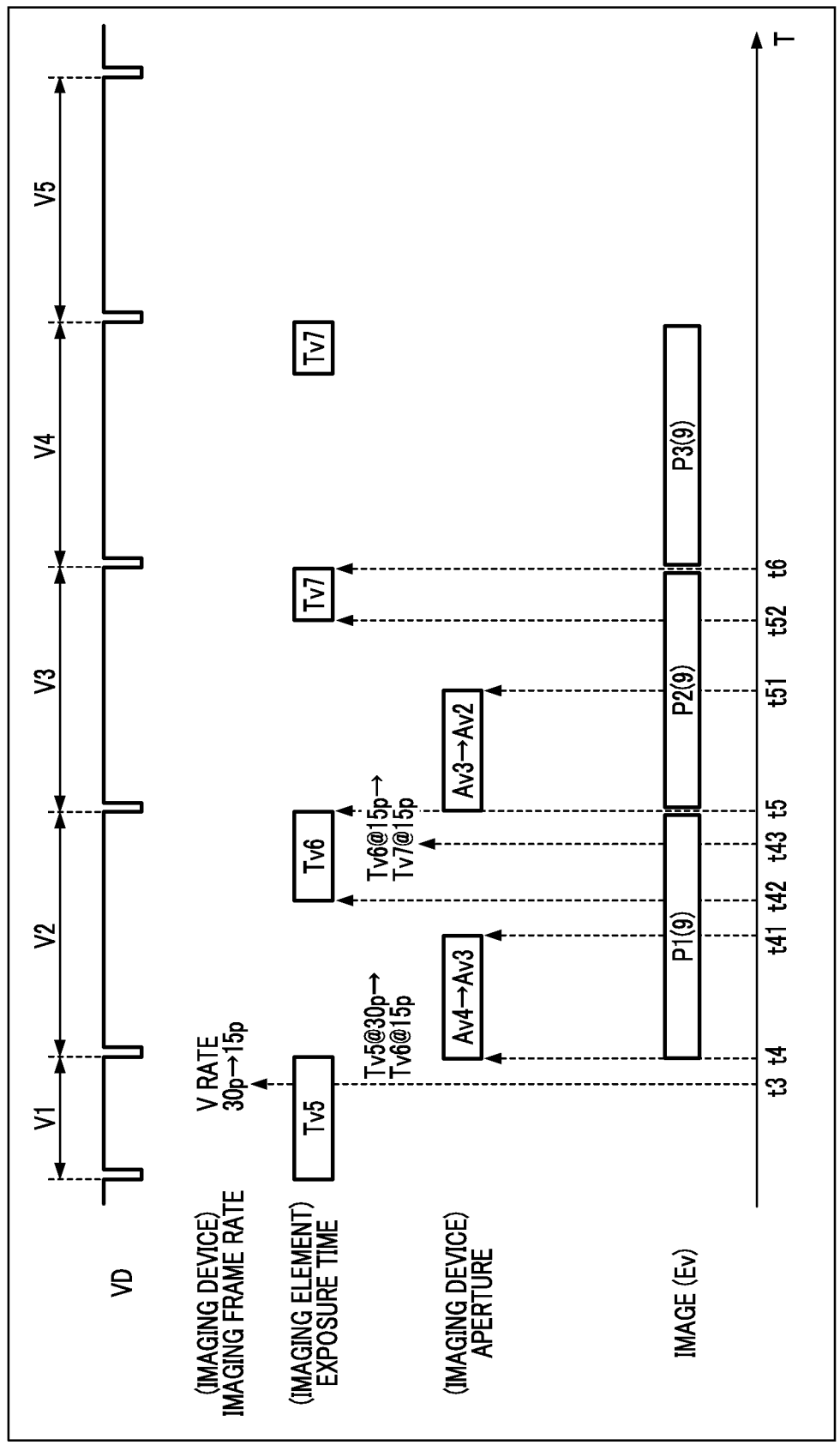
FIG. 6 is a diagram which shows a timing chart when a luminance range changes.

FIG. 6 is a diagram which shows a timing chart at the time of a luminance range change if the luminance of a subject has transitioned to low luminance.

FIG. 6 shows a timing of a vertical synchronization signal (VD) given to the imaging element 506 and an exposure timing of the imaging element 506. In the present example, the imaging device 400 performs a luminance range shift by −3 steps for low luminance tracking on the basis of an exposure control instruction from the imaging element 506. The imaging device 400 drops, for example, the aperture 2 steps from F4.0 to F2.0 (Av4 to Av2 according to Av value conversion), and further drops (lowers) an imaging frame rate from 30 FPS to 15 FPS. To drop the aperture by 2 steps is to perform an operation of opening the aperture by 2 steps. Note that the ND filter is retracted if the ND filter is inserted. A density of the ND filter is changed if an ND filter whose density is changeable is applied. The maximum value of exposure time can be controlled from 33.3 ms to 66.7 ms by dropping the imaging frame rate to half its value.

At time t3, if a request for changing the luminance range by −3 steps is made from the imaging element 506 to the imaging device 400, the overall control calculation unit 509 included in the imaging device 400 drops the aperture by 2 steps and further drops the imaging frame rate to half its value. First, the overall control calculation unit 509 adjusts a synchronization signal given to the imaging element 506 such that the imaging frame rate becomes 15 fps from a V2 period which is a next V period. In addition, the overall control calculation unit 509 performs electronic shutter setting in the imaging element 506 to have an exposure time equivalent to Tv6 in the V2 period. Next, the overall control calculation unit 509 instructs the shutter and aperture drive unit 505 to perform an operation of dropping the aperture by 1 step at time t4 which is a beginning position of the V2 period. The aperture drive temporarily ends at time t41, the exposure starts from time t42, and the exposure ends at time t5. The overall control calculation unit 509 performs the electronic shutter setting in the imaging element 506 to have an exposure time equivalent to Tv7 in a next V3 period at time t43 between the exposure start and the exposure end.

Next, the overall control calculation unit 509 instructs the shutter and aperture drive unit 505 to perform an operation of further dropping the aperture by 1 step at time t5 which is a beginning position of the V3 period. The aperture drive ends at time t51, the exposure starts at time t52, and the exposure ends at time t6.

As in the processing described with reference to FIG. 6, the imaging device 400 controls the imaging frame rate and the Av value and the imaging element 506 controls the Tv value in cooperation. As a result, occurrence of flickering is inhibited with respect to the images P1, P2, and P3 read out in the V2, V3, and V4 periods while a luminance range shift for low luminance is performed. The imaging device 400, with respect to the aperture, avoids aperture driving during the exposure time while performing a stepwise change in consideration of the time required for switching. In this manner, if the changes of the aperture and the ND filter are performed together with the luminance range shift according to lowering of the imaging frame rate (extending of a cycle), the imaging device 400 instructs a change in the aperture and the ND filter after instructing a change in the imaging frame rate first. As a result, it is possible to perform the aperture drive while an exposure period is avoided, and to suppress a flicker from occurring in live images which are being displayed. In contrast, if the changes of the aperture and the ND filter are performed together with the luminance range shift according to a raise of the imaging frame rate (shortening of a cycle), the imaging device 400 instructs a change in the aperture and the ND filter first. As a result, it is possible to suppress a flicker from occurring in the same manner by taking a longer timing to avoid the exposure period.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-143423, filed Jul. 31, 2018 which is hereby incorporated by reference wherein in its entirety.

What is claimed is:

1. An imaging element which outputs an image signal acquired by an imaging unit having a plurality of pixel portions, the imaging element comprising:
    a receiver configured to receive a target luminance value from an imaging device; and
    a controller configured to execute exposure control in the imaging element on the basis of an accumulation time of the pixel portion and a gain for an output signal of the imaging unit, which correspond to the target luminance value, wherein the controller instructs the imaging device to perform exposure control that shifts an exposure control range of the imaging element if a luminance value of a subject exceeds the exposure control range in the imaging element.

2. The imaging element according to claim 1, wherein the exposure control range in the imaging element is set by the imaging device for the imaging element in advance.

3. The imaging element according to claim 1, wherein the controller performs control such that an upper limit of an exposure control range in the imaging element before the exposure control is instructed is positioned at a center of the exposure control range in the imaging element after instructing the exposure control.

4. The imaging element according to claim 1, wherein the receiver further receives timing information on the exposure control from the imaging device, and the controller sets a timing of exposure control in the imaging element on the basis of the received timing information.

5. The imaging element according to claim 1, wherein an imaging device which has received an exposure control instruction from the imaging element executes the exposure control according to a predetermined exposure changing control.

6. The imaging element according to claim 5, wherein the predetermined exposure changing control is executed by using any one of an aperture, a ND filter, a digital gain, and an imaging frame rate.

7. The imaging element according to claim 6, wherein, if exposure control according to the aperture or the ND filter is performed together with a change of an imaging frame rate, the imaging device performs the exposure control according to the aperture or the ND filter at a timing that avoids an exposure time.

8. The imaging element according to claim 7, wherein, if exposure control according to the aperture or the ND filter is performed together with a change of an imaging frame rate, the imaging device instructs a change in the imaging frame rate before instructing a change in the aperture or the ND filter at the time of lowering the imaging frame rate, and instructs a change in the aperture or the ND filter before instructing a change in the imaging frame rate at the time of raising the imaging frame rate.

9. An imaging device comprising:
an imaging element which outputs an image signal acquired by an imaging unit having a plurality of pixel portions, the imaging element comprising:
 a receiver configured to receive a target luminance value from the imaging device; and
 a controller configured to execute exposure control in the imaging element on the basis of an accumulation time of the pixel portion and a gain for an output signal of the imaging unit, which correspond to the target luminance value; and
an exposure controller configured to receive an exposure control instruction from the imaging element and execute exposure control that shifts an exposure control range of the imaging element if a luminance value of a subject exceeds the exposure control range in the imaging element.

10. A method of controlling an imaging element which outputs an image signal acquired by an imaging unit having a plurality of pixel portions comprising:
receiving a target luminance value from an imaging device;
executing exposure control in the imaging element on the basis of an accumulation time of the plurality of pixel portions and a gain for an output signal of the imaging unit, which correspond to the target luminance value; and
instructing the imaging device to perform exposure control that shifts an exposure control range of the imaging element if a luminance value of a subject exceeds the exposure control range in the imaging element.

* * * * *